(12) United States Patent
Sinclair et al.

(10) Patent No.: US 8,759,749 B2
(45) Date of Patent: Jun. 24, 2014

(54) DIRECTIONAL RADIATION DETECTION TOOL

(75) Inventors: Paul L. Sinclair, Austin, TX (US); Christopher A. Schnoor, Austin, TX (US)

(73) Assignee: CBG Corporation, Austin, TX (US)

( * ) Notice: Subject to any disclaimer, the term of this patent is extended or adjusted under 35 U.S.C. 154(b) by 162 days.

(21) Appl. No.: 13/103,061

(22) Filed: May 7, 2011

(65) Prior Publication Data

US 2011/0272569 A1    Nov. 10, 2011

Related U.S. Application Data

(60) Provisional application No. 61/332,319, filed on May 7, 2010.

(51) Int. Cl.
*G01V 5/04*      (2006.01)
*G01V 5/06*      (2006.01)

(52) U.S. Cl.
CPC ........................................ *G01V 5/06* (2013.01)
USPC ........................... 250/266; 250/265; 250/256

(58) Field of Classification Search
CPC ........... G01T 1/00; G01T 3/06; G01T 1/1642; G01T 1/1644; G01T 1/2018; G01V 5/00; G01V 5/06
USPC ......................................... 250/266, 256, 265
See application file for complete search history.

(56) References Cited

U.S. PATENT DOCUMENTS

| | | | |
|---|---|---|---|
| 3,247,377 A | | 4/1966 | Hall, Jr. |
| 4,630,243 A | * | 12/1986 | MacLeod ........................ 367/82 |
| 4,829,176 A | | 5/1989 | Paske et al. |
| 4,894,534 A | * | 1/1990 | Paske et al. ................... 250/254 |
| 5,091,644 A | * | 2/1992 | Minette ......................... 250/254 |
| 5,345,084 A | | 9/1994 | Byrd |
| 5,525,797 A | * | 6/1996 | Moake ........................ 250/269.3 |
| 6,307,199 B1 | * | 10/2001 | Edwards et al. ............ 250/269.3 |
| 6,389,440 B1 | * | 5/2002 | Lewis et al. ................... 708/322 |
| 7,432,500 B2 | * | 10/2008 | Sale ............................. 250/269.3 |
| 2006/0096105 A1 | * | 5/2006 | Haugland ........................ 33/304 |
| 2006/0222145 A1 | | 10/2006 | Motomura et al. |
| 2009/0114829 A1 | | 5/2009 | He et al. |

FOREIGN PATENT DOCUMENTS

| | | | | |
|---|---|---|---|---|
| WO | 2009/122211 | | 10/2009 | ................ E21B 7/08 |
| WO | 2009/139959 | | 11/2009 | ............. G01N 23/04 |

* cited by examiner

*Primary Examiner* — David Porta
*Assistant Examiner* — Gisselle Gutierrez
(74) *Attorney, Agent, or Firm* — Campbell Stephenson LLP

(57) ABSTRACT

Various systems and methods for implementing a directional radiation detection tool are disclosed. One such method involves receiving outputs from several radiation sensors (e.g., gamma ray sensors), which are each facing a different direction. The received outputs are then combined, such that a directional error in one of the outputs is reduced, based upon another one of the outputs.

22 Claims, 6 Drawing Sheets

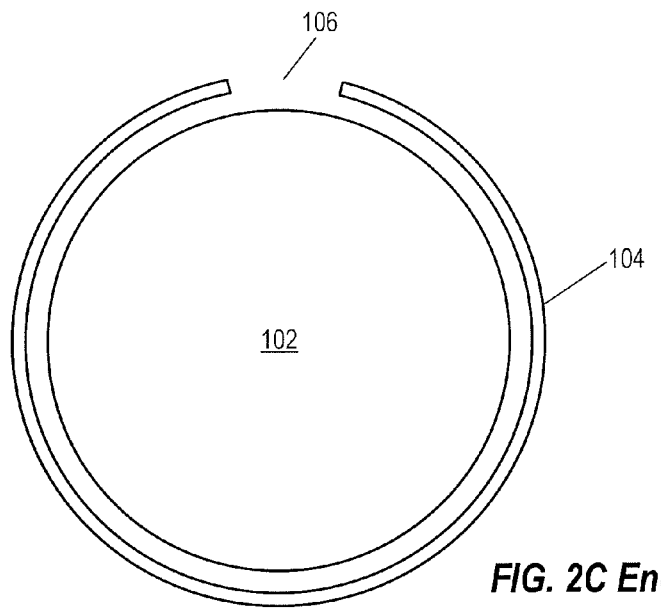
FIG. 2C End View
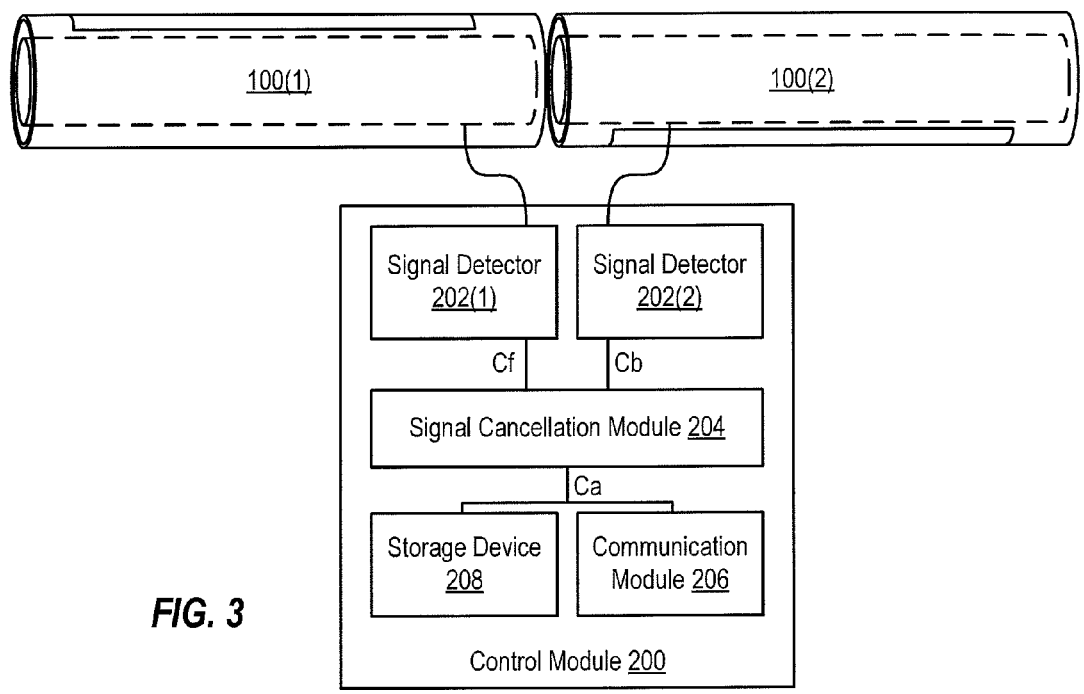
FIG. 3

DIRECTIONAL RADIATION DETECTION TOOL

PRIORITY CLAIM

This application claims the domestic benefit under Title 35, United States Code §119(e) of U.S. Provisional Patent Application Ser. No. 61/332,319, entitled "Directional Radiation Detection Tool," filed May 7, 2010, and naming Paul L. Sinclair and Christopher A. Schnoor as the inventors. This application is assigned to CBG Corporation, the assignee of the present invention, and is hereby incorporated by reference in its entirety and for all purposes as if completely and fully set forth herein.

FIELD OF THE INVENTION

This invention relates to the field of logging, particularly as used in oil and gas development and exploration.

DESCRIPTION OF THE RELATED ART

Logging is a technique that is used to measure one or more characteristics, such as resistivity, of subsurface geologic formations. Such a measurement can be used, for example, to determine the type of subsurface formation surrounding a drill bit. Accordingly, logging provides useful information to engineers and geologists engaged in hydrocarbon exploration and production as well as similar fields, such as mining.

Logging can be performed in a variety of ways, including open-hole logging, in which the drill pipe is temporarily removed from the wellbore so that a logging tool can be inserted, and logging-while-drilling (LWD, also known as measurement-while-drilling (MWD)). LWD systems differ from open-hole logging systems in that measurements can be obtained with LWD systems while the drill pipe is still in the wellbore. LWD systems permit various information to be measured in a formation very soon after the formation is penetrated by the drill bit. This provides substantially real-time information that (a) is obtained before the formation is substantially altered by inflow of drilling fluids or other factors and (b) may be used by the driller to control the drilling operation, for example by steering the bit so as to penetrate (or so as not to penetrate) a selected formation detected by the LWD system. LWD systems typically include transmitters and sensors disposed in or on sections of drill pipe that are located near the drill bit.

One type of sensor that can be used within a logging system is a radiation detector such as a gamma ray sensor. For example, a gamma ray sensor can be used to detect gamma photons emanating from a radioactive source. Gamma photon detection (or other types of radiation detection) can be used to identify rock types from known, naturally-occurring isotopes such as uranium, potassium, and thorium. When used in a logging system, a gamma ray sensor can be implemented in a ruggedized form (e.g., in the form of a drill collar or retrievable tool designed to withstand conditions within a drillstring) and used while drilling (e.g., to create oil & gas wells) to identify different types of rock through which the gamma ray sensor is passing. This knowledge of the can in turn aid in steering the drill bit. Unfortunately, many radiation detectors usable in drilling environments suffer from a lack of directional precision. Accordingly, improved directional radiation detection techniques for use in drilling environments are desirable.

BRIEF DESCRIPTION OF THE DRAWINGS

A more complete understanding of the present invention may be acquired by referring to the following description and the accompanying drawings, in which like reference numbers indicate like features.

FIG. 3 is a block diagram of a gamma ray tool that includes multiple gamma ray sensors, according to one embodiment of the present invention.

Figure 1:
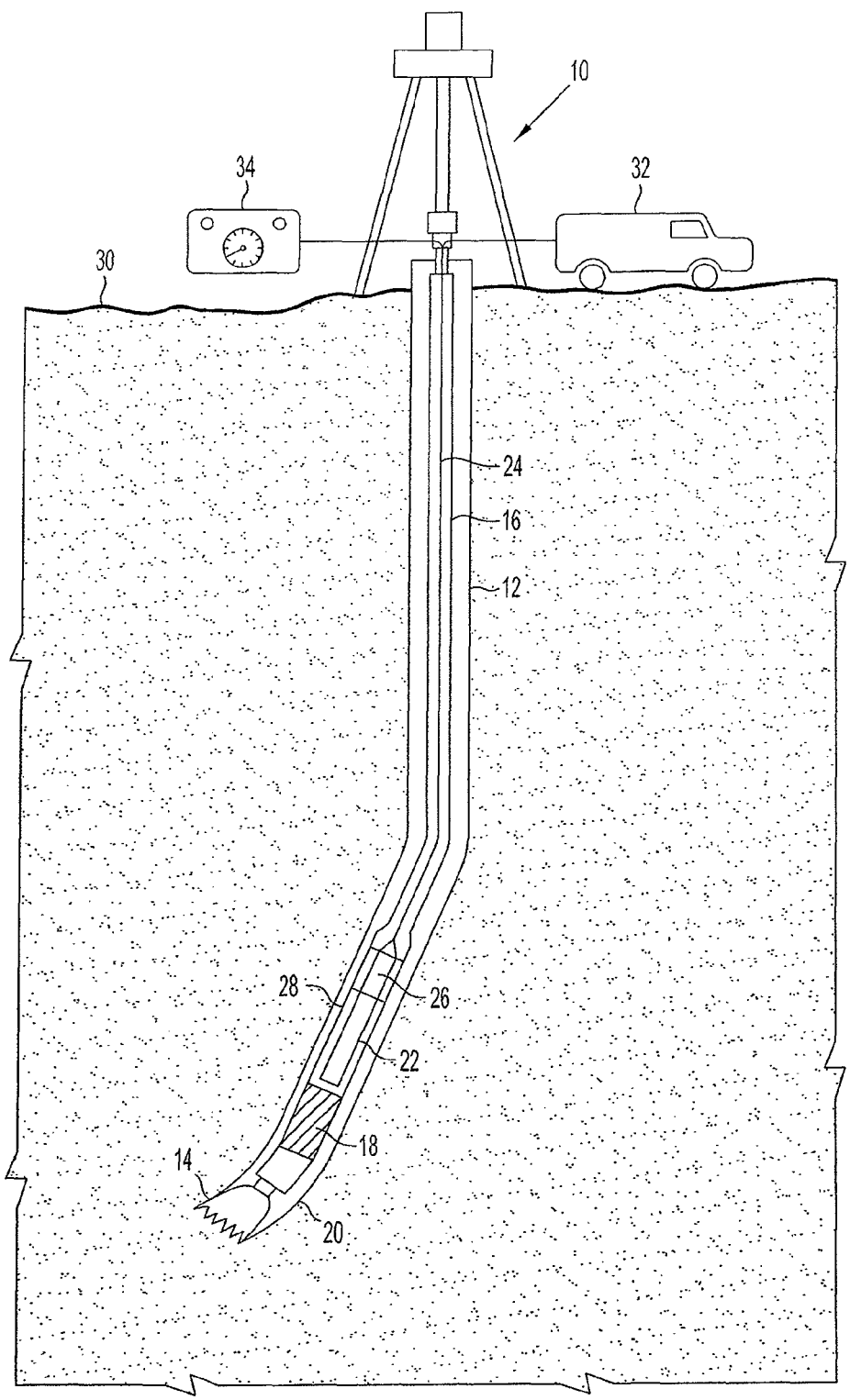
FIG. 1 illustrates a drilling system in which embodiments of the present invention can be employed.

While the invention is susceptible to various modifications and alternative forms, specific embodiments of the invention are provided as examples in the drawings and detailed description. It should be understood that the drawings and detailed description are not intended to limit the invention to the particular form disclosed. Instead, the intention is to cover all modifications, equivalents and alternatives falling within the spirit and scope of the invention as defined by the appended claims.

DETAILED DESCRIPTION

FIG. 1 illustrates how a drilling operation employs drilling rig 10 to cut a borehole 12 into the earth, penetrating the subsurface geological formation. Drillstring 16 passes through borehole 12 and is coupled between drilling rig 10 and a drill bit 14. Drillstring 16 includes drill bit 14, drill collars 28, and drill pipe.

The lowest part of drillstring 16 is made up of drill collars 28. Drill collars 28 are heavy walled pipe that provide weight on drill bit 14 and strength to resist buckling under their own weight. The drill pipe is thinner walled. The drill pipe is kept in tension (which may be effected by collars 28 placing weight on drill bit 14) to prevent buckling. Drill collars 28 may have radial projections (not shown) called stabilizers. Short drill collars, which may be adapted for specialized functions, are called "subs," and references herein to drill collars are intended to include subs.

Drilling rig 10 turns drill bit 14, which cuts through the rock at the bottom of borehole 12. In some situations, drilling rig 10 turns drill bit 14 by attaching drill bit 14 to the lower end of drillstring 16 and turning drillstring 16 with powered equipment at the surface. Alternatively, as shown in FIG. 1, drill bit 14 may be driven by a motor 18, which is adjacent to drill bit 14 in borehole 12, through bent sub 20. The illustrated arrangement is known as a "steering tool" system, in which drillstring 16 does not need to rotate to turn the drill bit. However, drillstring 16 can be turned to steer drill bit 14, so as to control the direction of advance of borehole 12, thus permitting the route of borehole 12 to be precisely steered as desired through the subsurface geologic formation.

A logging-while-drilling (LWD) tool 22 is placed in drillstring 16, near drill bit 14 (if LWD tool 22 is used for geosteering, it may be desirable to locate LWD tool 22 as close as possible to drill bit 14). In a steered system, the LWD tool may be placed above mud motor 18, such that LWD tool 22 receives power and/or returns data to the surface through a wire line cable 24 that is passed down the center of a non-rotating (or slowly rotating) drillstring 16. In a system that uses a rotating drillstring 16 to turn drill bit 14, LWD tool 22 may be placed just above drill bit 14, and a mud pulse data telemetry system (or any other appropriate telemetry method) can be used to return information to the surface. Thus, LWD tool 22 is operatively positioned in borehole 12, typically with an annular space (e.g., filled with drilling mud) between tool 22 and the borehole wall.

LWD tool 22 can incorporate or be associated with directional sensors 26 that provide directional information to the driller to assist in controlling the steering of the drill bit. For example, such directional sensors can be calibrated to indicate the position of the LWD tool 22 relative to an absolute direction, such as the gravity vector or magnetic north.

LWD tool 22 (or a set of multiple such LWD tools) includes several gamma ray sensors, as well as a control module that is configured to combine the outputs from the gamma ray sensors to produce a gamma ray tool output, as described in more detail below. LWD tool 22 can also include or be coupled to telemetry or other communication equipment to transmit this output to the earth's surface.

In some alternative embodiments, the sensors employed may detect forms of radiation other than gamma rays, in which case the control module will combine the outputs from multiple such radiation sensors to form an output in a similar manner to that described herein for gamma ray sensors. In general, a radiation detection tool, as described herein, refers to any tool that includes multiple radiation sensors, such as gamma ray sensors, and that combines the outputs from each of the multiple radiation sensors into a single tool output and wherein the outputs are combined in a manner such that the output of one sensor reduces a directional error in the output of another sensor.

Above the earth's surface 30, telemetry receivers and/or other appropriate communication equipment can be located in a logging truck 32 located near drilling rig 10. Thus, communication equipment is positioned to receive and interpret the information generated by LWD tool 22 and directional sensors 26, so that the information can be collected for later analysis and/or used to steer wellbore 12 into the desired position (e.g., to maximize recovery of hydrocarbons from a selected reservoir).

A data display panel 34 can be provided on or near drilling rig 10 and/or logging truck to give an operator (e.g., a driller, engineer, geologist, or the like) real-time information about the directional progress of wellbore 12 as well as the formation properties of the geologic formation currently near LWD tool 22. In one embodiment, data display panel 34 can be part of a computing device (e.g., data display panel 34 can be rendered on the screen of a laptop computer used by an operator of drilling rig 10).

Figure 2:
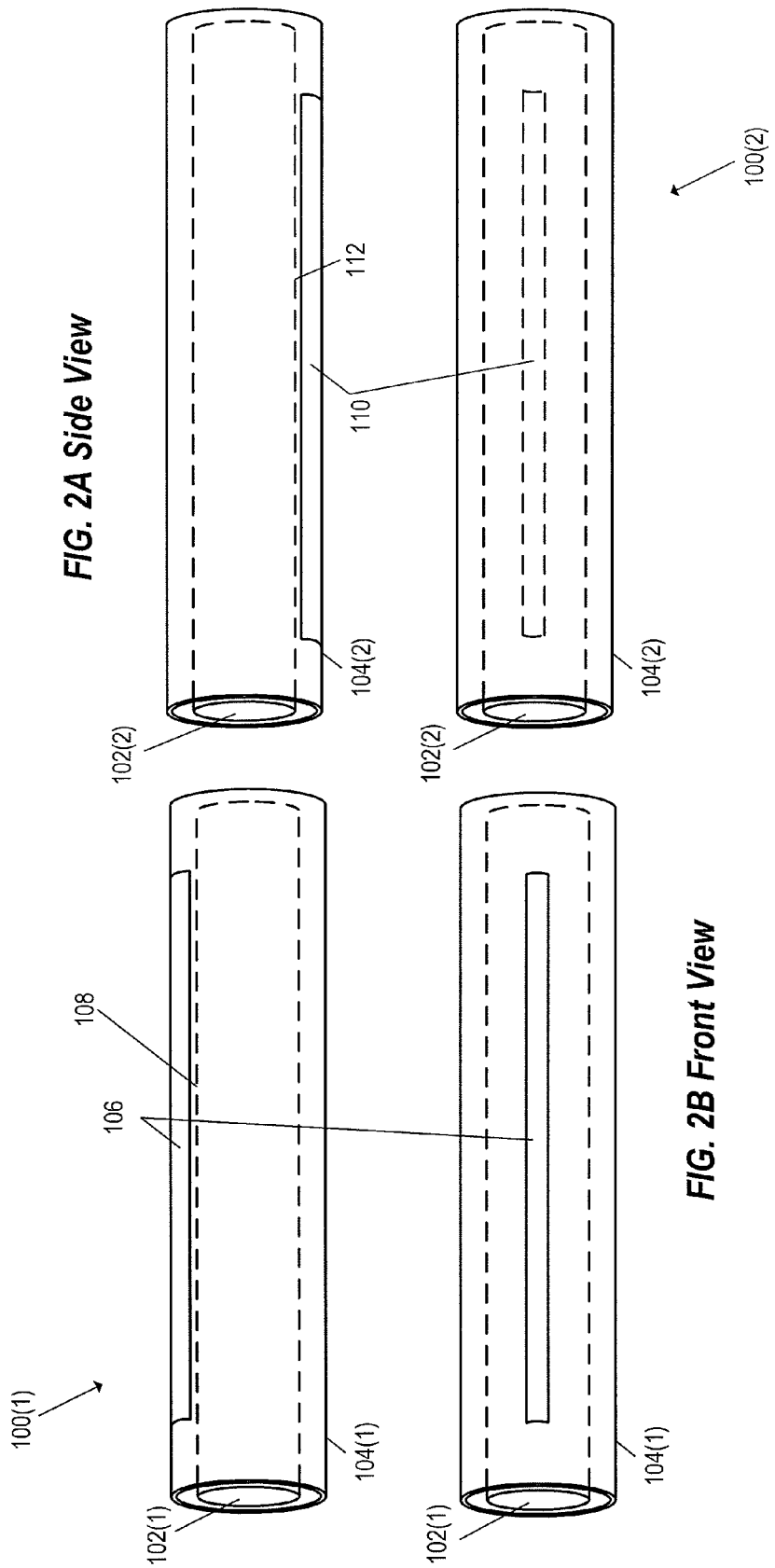
FIGS. 2A-2C illustrate example sensor arrangements that can be used in a drilling system, according to various embodiments of the present invention.

FIGS. 2A-2C illustrate different views of an example gamma ray sensor arrangement that can be used in a drilling environment like that shown in FIG. 1. In FIGS. 2A and 2C, there are two gamma ray sensors that are positioned proximate to each other with their ends aligned. Many other sensor configurations are possible in addition to those shown herein. Additionally, directional radiation sensors other than gamma ray sensors may be used in alternative embodiments.

The set of gamma ray sensors, in combination with a control module, form a gamma ray tool. Such a gamma ray tool can be included in one or more subs (e.g., drill collars, as briefly described above) for use as part of a drillstring, as described above. For example, two gamma ray sensors and a control module can be combined into a single sub. Alternatively, each gamma ray sensor can be implemented in a separate sub, and a corresponding control module can be located within a third sub or even on the surface. In yet other embodiments, one gamma ray sensor can include the control module, and this controller gamma ray sensor can be included within the same or a different sub than one or more other gamma ray sensors.

Generally, the components can be arranged in any manner in which the gamma ray sensors are placed in relative proximity to each other. In one embodiment, the sensors within the gamma ray sensors as placed as close together as practicable. Each gamma ray sensor is coupled to provide its output to a control module).

Each individual gamma ray sensor can include a sensor and shielding. The sensor can be a scintillator crystal (e.g., a sodium iodide crystal that produces a flash of light when excited by radiation such as gamma photons) coupled to a photo sensor (e.g., a photomultiplier) or other appropriate sensor. For example, one type of sensor includes a scintillator crystal combined with a photomultiplier. Other sensors can include a tube filled with a gas in which an electronic field is induced.

The shielding of each sensor is a heavy material, such as tungsten or lead, and, at least when scintillator-based gamma ray sensors are used, includes a longitudinal slot that forms a window through which gamma rays are allowed to reach the sensor. The shielding inhibits the ability of gamma photons (or other radiation) to reach the sensor, except in the area of the sensor exposed by the window. Thus, the window in the shielding focuses the sensor in a particular radial direction relative to the axis of the drillstring. This allows the sensor to effectively "look" either toward or away from a suspected type of rock that the driller may wish to avoid drilling into, while the driller monitors the output of the sensor. In one embodiment, the shielding is a generally cylindrical Tungsten shield that can be placed around a scintillator crystal.

As an alternative to scintillator-based gamma ray sensors, Geiger-Mueller tubes (also referred to as Geiger tubes, Geiger-Müller tubes, or GM tubes) may also be used as the individual gamma ray sensors (or as sensors configured to detect forms of radiation other than gamma rays, instead of and/or in addition to detecting gamma rays). In these Gieger-Mueller tubes, windows may be oriented differently (e.g., at the end of the tube, instead of in an axial window); however, the window in each sensor will be oriented to face a different direction than the windows in the other sensors, in the same manner as described for gamma ray sensors. If the windows have a different orientation, the sensors can be arranged so that the part of one sensor containing that sensor's window is arranged in relative proximity to the part of another sensor that contains the other sensor's window.

In the limited form factor available in which to implement a gamma ray sensor usable in drilling environments, it is not always possible to provide an adequate thickness of Tungsten to block all of the gamma photons from the undesired directions (i.e., the directions that are not currently facing the area of the sensor exposed by the window in the shielding). Some gamma photons have energy in the range of several million electron-volts (MeV), which would need a shielding thickness of several inches to completely block. Since it is impractical to build gamma ray sensors that are capable of blocking all gamma photons in the undesirable directions, an individual gamma ray sensor will have somewhat reduced ability to distinguish the direction to a contrasting rock. (A more detailed explanation of this phenomenon is provided below with respect to FIG. 5A.)

In order to compensate for the reduced accuracy of individual gamma ray sensors, the current gamma ray tool includes at least two gamma ray sensors and a control module for combining the output of those two gamma ray sensors. When two gamma ray sensors are used, the gamma ray sensors are oriented to face opposite directions, such that, relative to each other, one gamma ray sensor's window is positioned at 0 degrees and the other gamma ray sensor's window is positioned at 180 degrees.

While the type and/or configuration of gamma ray sensor may vary among different gamma ray tools, it is generally desirable that a given gamma ray tool include only sensors of the same type and/or configuration (e.g., a single gamma ray tool may include two gamma ray sensors that each include scintillator crystals and tungsten shielding in the same configuration).

Additional gamma ray sensors may be added and the orientation of each gamma ray sensor adjusted, such that the output from one gamma ray sensor can be corrected (to account for gamma photons detected by that gamma ray sensor that originated from the undesirable directions) based upon the output of the other gamma ray sensors. For example, when two gamma ray sensors are used, the gamma ray sensors can be oriented to face 180 degrees away from each other. When three gamma ray sensors are used, the gamma ray sensors can be oriented to face 120 degrees away from each other (e.g., one gamma ray sensor's window positioned at 0 degrees, a second gamma ray sensor's window positioned at 120 degrees, and a third gamma ray sensor's window positioned at 240 degrees). If four gamma ray sensors are used, the gamma ray sensors can be oriented to face 90 degrees away from each other (e.g., one gamma ray sensor's window positioned at 0 degrees, a second gamma ray sensor's window positioned at 90 degrees, a third gamma ray sensor's window positioned at 180 degrees, and a fourth gamma ray sensor's window positioned at 270 degrees). Other arrangements may also be implemented.

FIG. 2A illustrates an side view of two gamma ray sensors 100(1) and 100(2), as arranged for use as a gamma ray tool. Similarly, FIG. 2B illustrates a front view, in which the gamma ray tool including both sensors has been rotated 90 degrees towards the viewer. In both views, the two gamma ray sensors 100(1) and 100(2) are arranged in series (with respect to the long axis of each gamma ray sensor), end-to-end, with a small amount of space between the two gamma ray sensors. In embodiments where there are more than two gamma ray sensors, the gamma ray sensors can similarly be arranged in series.

Gamma ray sensor 100(1) includes a sensor 102(1) surrounded by generally cylindrical shielding 104(1). A longitudinal window 106 in shielding 104(1) is oriented to face upwards in FIG. 2A and towards the viewer in FIG. 2B.

Gamma ray sensor 102(1) includes a sensor 102(2) surrounded by generally cylindrical shielding 104(2). A longitudinal window 110 in shielding 104(2) is oriented to face downwards in FIG. 2A and away from the viewer (as indicated by the dashed line) in FIG. 2B. Thus, window 110 in sensor 100(2) is oriented to face 180 degrees away from the direction faced by window 106 in sensor 100(1).

In the illustrated example, the sensor (e.g., 102(1) or 102(2)) is positioned equidistantly from each end of the gamma ray sensor in which it is included. In alternative embodiments, the sensor may be positioned closer to a particular end of the gamma ray sensor. In these embodiments, the gamma ray sensors can be positioned so that the sensors are closer together. For example, if the sensors are closer to a back end of each gamma ray sensor, the gamma ray sensors can be oriented back end-to-back end in order to position the sensors more closely together.

FIG. 2C illustrates the end of a gamma ray sensor, showing the sensor 102 within the shielding 104. FIG. 2C illustrates how the window 106 in the shielding exposes a portion of the sensor. It is noted that the window may be filled in with a different, non-shielding material that protects the sensor 102 without inhibiting the ability of gamma photons to reach the sensor via the window 106 in the shielding 104.

FIG. 3 shows a gamma ray tool that includes two gamma ray sensors 100(1) and 100(2). Gamma ray sensors 100(1) and 100(2) are arranged in close proximity and have their windows facing in opposite directions. The two gamma ray sensors are coupled to a control module 200.

In this example, control module 200 includes two signal detectors 202(1) and 202(2), a signal cancellation module 204, a storage device 208, and a communication module 206. All or some of the components of control module 200 can be implemented in the same sub as one or more of the gamma ray sensors, in different subs, and/or on the surface. For example, signal detectors 202(1) and 202(2) and signal cancellation module 204 can be implemented in the same sub as the gamma ray sensors 100(1) and 100(2) and electrically coupled to a communication module 206 in another sub, while storage device 208 is implemented on the surface. Alternatively, all of the components can be implemented in the same sub as both gamma ray sensors.

Signal detector 202(1) is coupled to receive the output of gamma ray sensor 100(1), while signal detector 202(2) is coupled to receive the output of gamma ray sensor 100(2). Typically, the output from a gamma ray sensor includes a series of electrical pulses. The electrical pulses correspond to the excitations of the sensor (e.g., a scintillator crystal) within the gamma ray sensor in response to detection of gamma ray photons (or other radiation, if radiation sensors other than gamma ray sensors are used). In some embodiments, each electrical pulse in the output corresponds to an individual photon detected by the sensor.

Thus, each signal detector 202(1) and 202(2) receives a respective output from a respective gamma ray sensor. Each signal detector then accumulates (e.g., using a counter) the pulses over a fixed time interval (e.g., one or more seconds). Each signal detector can then provide its accumulated value, which indicates the number of pulses received in the prior interval, to signal cancellation module 204. In some embodiments, each signal detector may also, at least temporarily, store the accumulated values. The output of signal detectors 202(1) and 202(2) can be synchronized (e.g., using a clock signal), such that signal cancellation module 204 will receive one accumulated value each clock cycle from each signal detector. These accumulated values each provide a count-rate, indicating the number of gamma ray photons detected per time interval.

Signal cancellation module 204 receives the accumulated values from signal detectors 202(1) and 202(2) and combines the values to produce a gamma ray tool output, which also takes the form of a count-rate. This gamma ray tool output is a directionally-corrected output that is based upon the outputs from all of the individual gamma ray sensors (here, gamma ray sensors 100(1) and 100(2)) within the gamma ray tool. The gamma ray tool output can be stored (e.g., within storage device 208) within the gamma ray tool and/or transmitted to the surface.

Signal cancellation module 204 designates one gamma ray sensor (e.g., gamma ray sensor 100(1)) as the front-facing gamma ray sensor and the other gamma ray sensor (e.g., gamma ray sensor 100(2)) as the back-facing gamma ray sensor. This designation can be arbitrary, so long as it is used consistently for each calculation. If more than two gamma ray sensors are used, other designations (e.g., specifying one gamma ray sensor as facing 0 degrees, another as facing 90 degrees, and so on) can be used to differentiate the gamma ray sensors. Signal cancellation module 204 will use the accumulated value generated from the output of one or more gamma ray sensors (e.g., gamma ray sensor 100(2) in this example) to directionally correct the accumulated value generated from the output of the other gamma ray sensor (e.g., gamma ray sensor 100(1) in this example).

In order to directionally correct the accumulated value generated from the output of a gamma ray sensor, the control module is calibrated for the particular type, configuration, and/or manufacturer of the gamma ray sensor that will be used. Accordingly, before the gamma ray tool is implemented, a representative gamma ray sensor (e.g., of the same type, configuration, and manufacturer as those that will be used in the gamma ray tool or a set of gamma ray tools) can be evaluated in a laboratory (alternatively, such a tool can be evaluated via simulation). A radioactive source of a representative isotope can be placed near the representative gamma ray sensor. The radioactive source can be separated from the representative gamma ray sensor by a distance that is typical of that found within a borehole radius.

Initially, the representative gamma ray sensor is set with its window facing the radioactive source (this position is referred to as 0 degrees). The representative gamma ray sensor can then be rotated (such that its window in its shielding moves with respect to the radioactive source) from 0 to 360 degrees (e.g., looking at FIG. 3C, the window of the gamma ray sensor is currently positioned at 0 degrees and can be rotated 360 degrees around the central point of the figure) while operating. The output of the representative gamma ray sensor is recorded (e.g., in terms of count-rate) for evaluation.

Figure 5A:
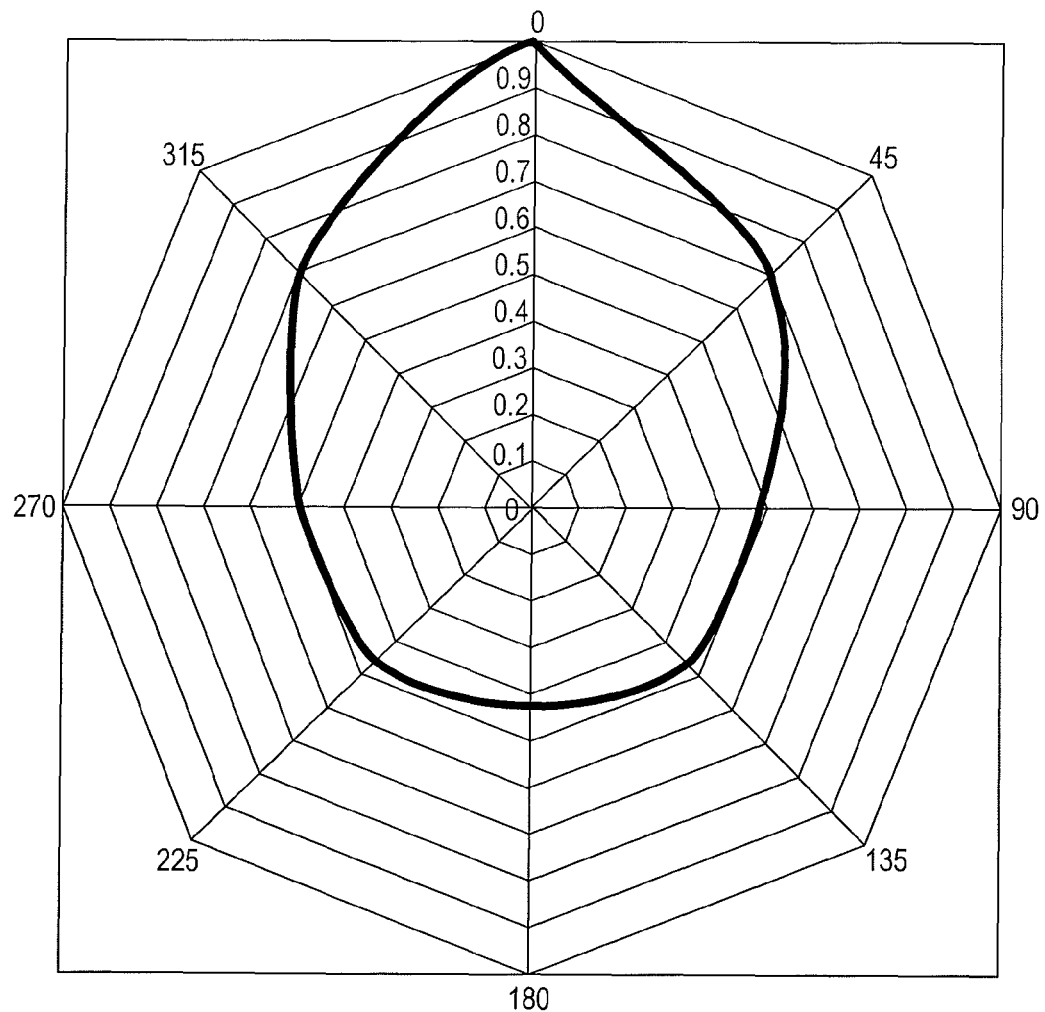
FIGS. 5A and 5B show a set of graphs that allow a comparison between the output of a single gamma ray sensor with the output of a gamma ray tool that includes two gamma ray sensors whose output are combined, according to one embodiment of the present invention.

As an example, FIG. 5A shows the uncorrected output of a representative gamma ray sensor. In this example, the representative gamma ray sensor has tungsten shielding with a thickness of 0.125 inches (3.175 millimeters). Here, the pulses output from the representative gamma ray sensor have been accumulated to obtain multiple count-rates, each of which has been normalized to one and plotted on a polar graph. This polar graph illustrates the directional abilities of the uncorrected gamma ray sensor. As shown in FIG. 5A, when the window is facing 0 degrees (i.e., directly towards the radioactive source), the normalized response is at a maximum and has a value of 1 count per increment of time. As the window is rotated away from the radioactive source, the normalized response is reduced. When the window faces 45 degrees, and again when the window faces 315 degrees, the normalized response is 0.7 counts per increment of time. When the window faces 90 degrees, and again when the window faces 270 degrees, the normalized response is approximately 0.5 counts per increment of time. When the window faces 135 degrees, and again when the window faces 225 degrees, the normalized response is approximately 0.475 counts per increment of time. When the window faces 180 degrees (i.e., directly away from the radioactive source), the normalized response is approximately 0.42 counts per increment of time.

It can be seen that the normalized response is a maximum in the desired direction (0 degrees) and a minimum in the opposite direction (180 degrees). However, even though the response is minimized when the representative gamma ray sensor faces away from the radioactive source, there is still a fairly significant response in that direction. This response is due to photons passing through the shielding of the representative gamma ray sensor. It is desirable to minimize this response in order to improve the directionality of the gamma ray sensor. In other words, it is desirable for the gamma ray sensor's response to more definitely indicate the location of the radioactive source.

In the example shown, with a Tungsten shield thickness of 0.125 inches, the best Front/Back ratio $R_{fb}$ is about 1.0/0.42, or approximately 2.4. This Front/Back ratio $R_{fb}$ is the ratio of the count-rate measured from the front, when the window is facing the radioactive source (i.e., 0 degrees in the example of FIG. 5A), to the count-rate measured from the back, when the window is facing away from the radioactive source (i.e., 180 degrees in the example of FIG. 5A)). As is described in more detail below, once $R_{fb}$ is known for a particular type of gamma ray sensor, a gamma ray tool that compensates for the backward response of that type of gamma ray sensor can be implemented.

Returning to FIG. 3, the control module 200 uses the output from one gamma ray sensor to modify the output of the other gamma ray sensor. In this example, gamma ray sensor 100(2) is referred to as the backward-facing gamma ray sensor and outputs a signal that is used to generate a backward-facing count $C_b$. Similarly, gamma ray sensor 100(1) is referred to as the forward-facing sensor and outputs a signal which is used to generate a forward-facing count $C_f$. Signal cancellation module 204 uses $C_b$ to modify $C_f$. The modified count rate is the answer count rate, $C_a$. In particular, signal cancellation module 204 calculates the difference in the count-rates obtained from the outputs of the forward- and backward-facing sensors ($C_f$ and $C_b$) after first dividing $C_b$ by $R_{fb}$, such that $C_a = C_f - (C_b/R_{fb})$.

Figure 5B:
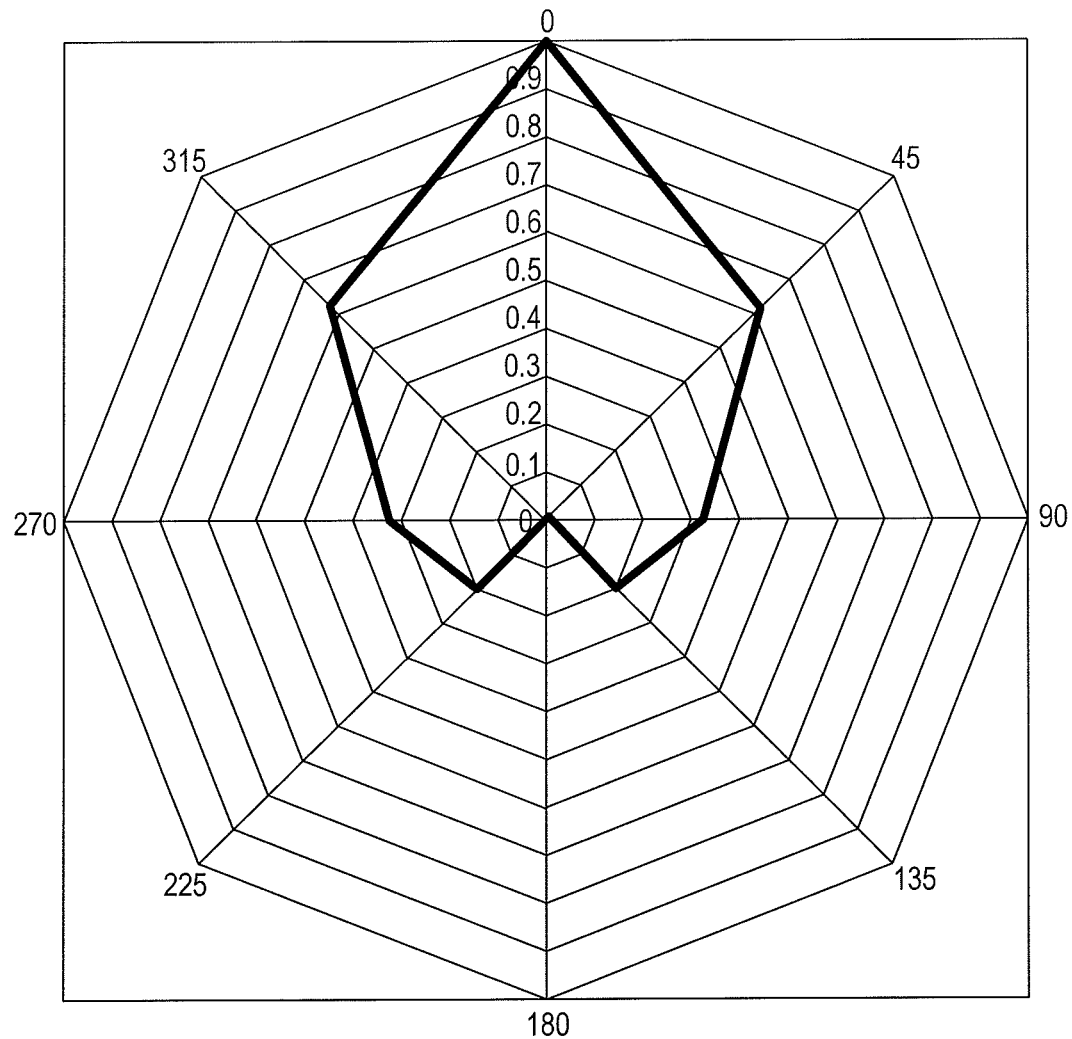

FIG. 5B illustrates the output $C_a$ of a gamma ray tool that uses two sensors of the type whose directional response is shown in FIG. 5A. As shown, the normalized count rate $C_a$ is strongest (having a value of 1) when the window of the forward-facing sensor is facing directly towards the radioactive source (at 0 degrees in this example). As the gamma ray tool is rotated, such that the forward-facing window is no longer directly facing the radioactive source, the directional response decreases. Thus, when the forward-facing window is facing 45 degrees and 315 degrees away from the radioactive source, $C_a$ is approximately 0.7. When the forward-facing window is facing 90 and 270 degrees away from the radioactive source, $C_a$ is approximately 0.31. When the forward-facing window is facing 135 and 225 degrees away from the radioactive source, $C_a$ is approximately 0.2. When the forward-facing window is facing directly away from the radioactive source (at 180 degrees), $C_a$ is nearly zero. As can be seen by comparing FIGS. 5A and 5B, the output of the gamma ray tool has improved directional response relative to the output generated from an individual gamma ray sensor.

Returning to FIG. 3, in effect, the backward-facing sensor's output is used to cancel the portion of the count rate in the forward-facing sensor due to gamma photons that were able to pass through the Tungsten shield, while only moderately (if at all) reducing the count-rate due to photons that enter through the window. If the forward-facing sensor is actually facing away from a radioactive source at the time that a measurement is taken by the gamma ray tool, this cancellation will reduce the response of the tool, since the bulk of the photons that are entering the forward-facing sensor are entering via the shielding, not the window.

Other equations may also be used to generate $C_a$, particular if the number of gamma ray sensors in use within the gamma ray tool is increased. For example, if there are four gamma ray sensors, other ratios (e.g., comparing the response at 0 degrees, facing the radioactive source, to the response at the "right" side (e.g., 90 degrees in FIG. 5A) and to the response at the "left" side (e.g., 270 degrees in FIG. 5A)) may be determined and used to scale the output from the other sensors, which can then be combined with $C_f$ to generate $C_a$.

The photons being sensed by the gamma ray sensors do not always follow straight lines. Instead, these photons are often scattered while passing through solid materials. As such, there may still be some directional uncertainty in a gamma ray tool implemented using the above-described techniques. Additionally, techniques that perform signal cancellation by subtracting measured values may to some degree increase the statistical uncertainty of the resulting measurement.

In order to reduce either or both of these potential effects, the gamma ray tool can be configured to accumulate count-rates (e.g., $C_f$ and $C_b$) generated from the output of the individual sensors over a longer period. For example, the normal counting period may be from one to several seconds, whereas with the described gamma ray tool this counting period may be extended by a factor of four to sixteen times. Such an extension can reduce the statistical uncertainty by a factor of two to four times respectively. The extra time involved is not likely to have a significant adverse effect on performance, since normally drilling will be halted briefly to perform these measurements as well as other measurements (e.g., survey measurements and the like).

A gamma ray sensor will typically be operated in a drill collar (i.e., a sub), which may affect the response of the gamma ray sensor relative to the representative gamma ray sensor evaluated in the lab. In order to compensate for this effect, the gamma ray tool can be calibrated for operation inside a particular type (e.g., size, material, and/or configuration) of drill collar. Calibration may involve determining an additional modification to perform on the count rate before outputting the modified count rate as the output of the gamma ray tool. Alternatively, calibration may involve modifying $R_{fb}$ to account for the effect of the drill collar on the performance of the gamma ray sensor. If a gamma ray tool that has been calibrated for use within a particular type of drill collar is used inside of a different type of drill collar, an additional correction can be applied (e.g., either to $R_{fb}$ or to $C_a$) to compensate for the use of that different type of drill collar.

After signal cancellation module 204 has combined $C_f$ and $C_b$ (or other appropriate count rates, if more than two gamma ray sensors are being used), the resulting answer count rate $C_a$ can be stored in storage device 208. Storage device 208 is any type of storage device that can store data. Storage device 208 can, for example, include random access memory. In some embodiments, storage device 208 can persistently store data, even if power is not being supplied to storage device 208. For example, storage device 208 can include Flash memory, solid state storage, a hard disk, a writable compact or digital versatile disc, or the like.

The answer count rate $C_a$ output by signal cancellation module 204 can also (or alternatively) be output via communication module 206. In one embodiment, communication module 206 is configured to transmit the answer count rate from a sub to the surface (e.g., via mud pulse telemetry or wire line cable).

Control module 200 can operate continuously, such that in every period in which count rates are generated from the output of the individual gamma ray sensors, control module 200 will calculate and output a corresponding answer count rate $C_a$. These count rates can be stored in storage device 208 and/or transmitted via communication module 206 as they are generated. Additionally, the count rates may be stored with other information. For example, the count rates may be associated with timestamps or other information that can be used to order count rates relative to each other in time. Similarly, the count rates can be associated with data generated by another tool, such as the orientation of the gamma ray tool relative to an absolute direction (e.g., magnetic north or the gravity vector).

As the gamma ray tool moves through the borehole, the value of $C_a$ may change. These changes can, in at least some embodiments, be provided to a drilling operator on the surface in real time for use in steering the drill bit so as to stay within a particular formation. For example, the output of the gamma ray tool can be used to determine whether the drill bit is approaching or moving away from a more radioactive type of rock. The drilling operate may control the orientation of the gamma ray sensors In some embodiments, control module 200 may calculate $C_a$ more than once for each set of count rates generated from the outputs of the gamma ray sensors. For example, when two gamma ray sensors are included within gamma ray tool, control module 200 may calculate a first version of $C_a$ in which the count rate generated from gamma ray sensor 100(1) is used as $C_f$, as shown in FIG. 3. Control module 200 may also calculate a second version of $C_a$ in which the count rate generated from the output of gamma ray sensor 100(2) is used as $C_f$. By calculating $C_a$ multiple times (e.g., once for each gamma ray sensor included in the gamma ray tool) for each set of count rates generated from the individual gamma ray sensor outputs, control module 200 effectively simultaneously (or nearly simultaneously) obtains directional measurements in two directions, without having the rotate the gamma ray tool within the borehole. If measurements in more than two directions are desired, the drilling operator can rotate the drillstring, such that the windows of the gamma ray sensors in the gamma ray tool are turned to face a different direction.

As noted above, in some embodiments, all of part of control module 200 may be implemented on the surface. Thus, in some embodiments, $C_f$ and $C_b$ (or other appropriate count rates generated from the output of individual gamma ray sensors) may be transmitted to the surface via communication module 206, and signal cancellation module 204 and/or storage device 208 may be implemented on the surface (e.g., in laptop computer used by a drilling operator). In still other embodiments, the gamma ray tool can store $C_f$ and $C_b$ (or other appropriate count rates) while in use within the drill string. The gamma ray tool may then be removed from the drill string. An operator may retrieve the stored count rates and input those count rates to a signal cancellation module 204 on the surface.

Figure 4:
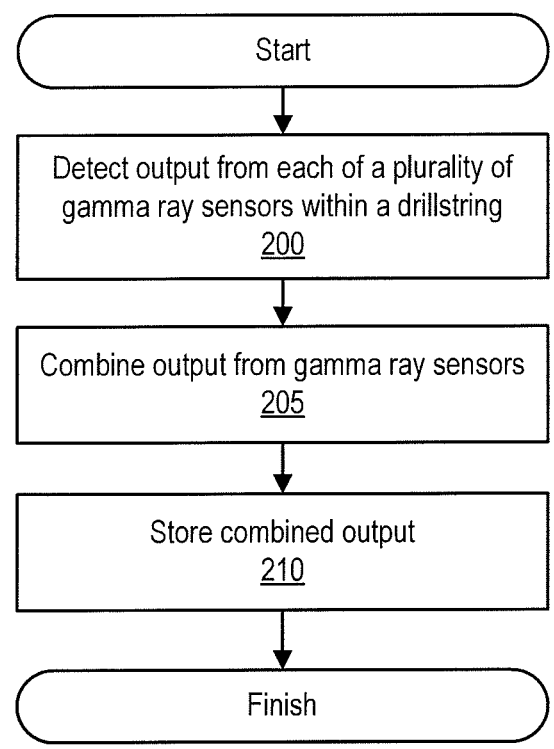
FIG. 4 is a flowchart of a method of operating the gamma ray tool, according to one embodiment of the present invention.

FIG. 4 is a flowchart of a method of using a gamma ray tool that has a sensor arrangement like one of those described above, in which more at least two radiation sensors are arranged with their windows close together and the signals detected by those radiation sensors are combined in order to reduce directional error in the signal detected by at least one of the radiation sensors. This method is explained with reference to a gamma ray tool like that shown in FIG. 3, which uses gamma ray sensors as its radiation sensors.

The method begins at 200, when the gamma ray tool detects the output from each of a plurality of gamma ray sensors arranged end-to-end within a drillstring. The gamma ray sensors are arranged so that each gamma ray sensor faces in a different axial direction. The outputs from these sensors can be accumulated over time to generate a count rate corresponding to the output of each individual sensor.

At 205, the gamma ray tool combines the outputs (e.g., in the form of count rates) from the individual gamma ray sensors in order to cancel out a portion of the output of one sensor that was generated based on photons that reached the sensor through the shielding (as opposed to the window in the shielding) of that sensor. For example, when two gamma ray sensors are being used, the output of a backward-facing sensor can be scaled by $R_{fb}$ (a scaling factor determined by calibrating the particular type of gamma ray sensor being used) and then subtracted from the output of a forward-facing sensor. If more than two sensors are used, a scaling factor can be determined for each sensor other than the forward-facing sensor. This scaling factor can be applied to the output of the associated sensor, and the scaled outputs from each of those other sensors can then be subtracted from the output of the forward-facing sensor. Other techniques for combining the outputs may also be used.

After the combined output (e.g., an answer count rate $C_a$ as described above) has been generated, the combined output can be stored, as shown at 210. The combined output can alternatively or additionally be transmitted to another device for display to a drilling operator and/or storage as part of a log.

In some embodiments, at least some of the components shown in FIG. 5 are included within the drill collar implementing a logging while drilling tool. For example, at least some of these components can be placed within one or more cavities within the drill collar. Alternatively, all or some of these components can be located within a cartridge that is configured to be coupled to or located within the drill collar (e.g., such a cartridge can be suspended within the drilling mud channel). In one embodiment, such a cartridge includes components such as electronic circuits, communication circuits, directional sensors (e.g., configured to detect a standard directional vector, such as the gravity vector or magnetic North), and the like. In some embodiments, this inner cartridge is retrievable, such that the inner cartridge can be installed and/or withdrawn from the logging while drilling tool while the logging while drilling tool is below the surface. For example, the inner cartridge can be installed or withdrawn through the drillstring using a slick line cable or wireline attached to the upper end of the logging while drilling tool. The drillstring can include a muleshoe (not shown) to accept and orient the inner cartridge in such an embodiment.

It is noted that all or some of the control module 200 shown in FIG. 3 can be implemented in software executing on a computing device (e.g., a personal computer, server, personal digital assistant, cell phone, laptop, workstation, or the like located on the surface, or a special purpose computing device implemented within a sub). In particular, such a computing device includes one or more processors (e.g., microprocessors, PLDs (Programmable Logic Devices), or ASICs (Application Specific Integrated Circuits)) configured to execute program instructions stored in a memory. Such a memory can include various types of RAM (Random Access Memory), ROM (Read Only Memory), Flash memory, and the like. The computing device can also include one or more interfaces (e.g., such as network interfaces, one or more interfaces to storage devices, and/or one or more interfaces to an input/output (I/O) device such as a keyboard, digital tablet, mouse, monitor, or the like), which can each be coupled (e.g., by a bus or other interconnect) to the processor(s) and memory.

It is noted that the program instructions and data consumed by and/or implementing all or part of control module 200 can be stored on various computer readable media such as storage device 208. In some embodiments, such program instructions can be stored on a computer readable storage medium such as a CD (Compact Disc), DVD (Digital Versatile Disc), hard disk, optical disk, tape device, floppy disk, and the like. In order to be executed by a processor, the instructions and data are loaded into memory from the other computer readable storage medium. The instructions and/or data can also be transferred to a computing device for storage in such a memory via a network such as the Internet or upon a carrier medium.

Although the present invention has been described in connection with several embodiments, the invention is not intended to be limited to the specific forms set forth herein. On the contrary, the present invention is intended to cover such alternatives, modifications, and equivalents as can be reasonably included within the scope of the invention as defined by the appended claims.

What is claimed is:

1. A method comprising:
 receiving a first output from a first radiation sensor and a second output from a second radiation sensor, wherein the first output and the second output are generated while the first radiation sensor and the second radiation sensor are within a wellbore into a formation, wherein the first output indicates a location of a radioactive source within the formation, and wherein a window in the first radiation sensor faces a different direction than a window in the second radiation sensor; and
 combining the first output and the second output, wherein the combining reduces a directional error in the first output's ability to indicate the location of the radioactive source, based upon the second output.

2. The method of claim 1, wherein the combining comprises scaling the second output by a ratio to generate a cancellation value and subtracting the cancellation value from the first output.

3. The method of claim 1, wherein the window in the first radiation sensor faces 180 degrees away from a direction faced by the window in the second radiation sensor.

4. The method of claim 1, further comprising receiving a third output from a third radiation sensor and a fourth output from a fourth radiation sensor, wherein the combining comprises combining the first output, the second output, the third output, and the fourth output.

5. The method of claim 1, further comprising repeating said receiving and said combining a plurality of times for an additional first output and an additional second output, wherein the additional first output and the additional second output are generated while the first and second radiation sensors are at a different location in the wellbore relative to a location at which the first and second outputs were generated.

6. The method of claim 1, wherein the combining generates a radiation tool output, and wherein the method further comprises displaying the radiation tool output to a drilling operator while the first radiation sensor and the second radiation sensor are within the wellbore.

7. The method of claim 1, wherein the first radiation sensor comprises a scintillator crystal surrounded by a tubular Tungsten shield, wherein the tubular Tungsten shield comprises an axial window through which photons can reach the scintillator crystal.

8. A system comprising:
 a drill collar;
 a first radiation sensor, wherein the first radiation sensor comprises a first shielding window and is configured to generate a first output, wherein the first output indicates a location of a radioactive source within a formation;
 a second radiation sensor, wherein the second radiation sensor comprises a second shielding window and is configured to generate a second output, wherein the second shielding window faces a different direction in a wellbore into the formation than the first shielding window; and a control module, wherein the control module is configured to combine the first output and the second output such that a directional error in the first output is reduced, based upon the second output.

9. The system of claim 8, wherein the control module is located within the drill collar.

10. The system of claim 8, wherein the control module is configured to scale the second output by a ratio to generate a cancellation value and to subtract the cancellation value from the first output to generate a radiation detection tool output.

11. The system of claim 8, wherein the first shielding window in the first radiation sensor faces 180 degrees away from a direction faced by the second shielding window in the second radiation sensor.

12. The system of claim 8, further comprising a third radiation sensor configured to generate a third output and a fourth radiation sensor configured to generate a fourth output, wherein the control module is configured to combine the first output, the second output, the third output, and the fourth output.

13. The system of claim 8, wherein the control module is configured to combine an additional first output from the first radiation sensor with an additional second output from the second radiation sensor, and wherein the additional first output and the additional second output are generated while the first and second radiation sensors are at a different location in the wellbore relative to a location at which the first and second outputs were generated.

14. The system of claim 8, wherein the control module is configured to generate a radiation detection tool output, and wherein the system further comprises a display device, wherein the display device is configured to display the radiation tool output to a drilling operator while the first radiation sensor and the second radiation sensor are within the wellbore.

15. The system of claim 8, wherein the first radiation sensor comprises a scintillator crystal surrounded by a tubular Tungsten shield, wherein the tubular Tungsten shield comprises an axial window through which photons can reach the scintillator crystal.

16. A system comprising:

first direction radiation sensor means, wherein the first directional radiation sensor means faces a first direction and generates a first output, wherein the first output indicates a location of a radioactive source within a formation;

second radiation sensor means, wherein the second radiation sensor means faces a second direction in a wellbore into the formation, different than the first direction of the first radiation sensor mean, and wherein the second radiation sensor means generates a second output; and control means for combining the first output and the second output such that a directional error in the first output is reduced, based upon the second output.

17. The system of claim 16, wherein the control means scales the second output by a ratio to generate a cancellation value and subtracts the cancellation value from the first output to generate a radiation detection tool output.

18. The system of claim 16, wherein the first radiation sensor means faces 180 degrees away from the second direction faced by the second radiation sensor means.

19. The system of claim 16, further comprising third radiation sensor means for generating a third output and fourth radiation sensor means for generating a fourth output, wherein the control means generate the radiation detection tool output based upon a combination of the first output, the second output, the third output, and the fourth output.

20. The system of claim 16, wherein the control means combine an additional output from the first radiation sensor means with an additional output from the second radiation sensor means, and wherein the additional first output and the additional second output are generated while the first and second radiation sensor means are at a different location in the wellbore relative to a location at which the first and second outputs were generated.

21. The system of claim 16, further comprising display means for displaying an output generated by the control means to a drilling operator while the first radiation sensor means and the second radiation sensor means are within the wellbore.

22. The system of claim 16, wherein the first radiation sensor means comprises gamma ray sensor means.

* * * * *